United States Patent [19]

Slocombe et al.

[11] 4,413,695

[45] Nov. 8, 1983

[54] VEHICLE WITH TILTABLE CAB

[75] Inventors: Joseph Slocombe, Chelmsford; Michael A. Parry, Billericay, both of England

[73] Assignee: Ford Motor Company, Dearborn, Mich.

[21] Appl. No.: 156,231

[22] Filed: Jun. 4, 1980

[30] Foreign Application Priority Data

Jun. 14, 1979 [GB] United Kingdom ............... 7920800

[51] Int. Cl.$^3$ ............................................. B62D 33/06
[52] U.S. Cl. ................................. 180/89.14; 292/129
[58] Field of Search ..................... 180/89.14; 292/111, 292/129, 201

[56] References Cited

U.S. PATENT DOCUMENTS 3,819,225  6/1974  Carlisle et al. ................ 180/89.14
3,841,693 10/1974  Reynolds et al. ............. 180/89.14
4,206,826  6/1980  McMillen et al. ............. 180/89.14

Primary Examiner—Richard A. Bertsch

Attorney, Agent, or Firm—John J. Roethel; Daniel M. Stock; Clifford L. Sadler

[57] ABSTRACT

A motor vehicle comprises a body structure, a cab mounted on the body structure for movement about a pivot axis between a normal operating position and a tilted position, and a support radially spaced from the pivot axis for supporting the cab structure on the body structure in the normal operating position of the cab, at least one of the supports comprising a keeper attached to one of the structures and a latch member attached to the other structure and mounted for movement into and out of latch engagement with the keeper when the cab is in its normal operating position, the keeper comprising a bracket mounted on the said one structure and a striker pin resiliently mounted on the bracket. The resiliently mounting of the striker pin in the bracket minimizes wear between the striker pin and the latch member during use of the vehicle and also reproduces vibrations transmitted from the body structure into the cab structure.

17 Claims, 8 Drawing Figures

FIG.5

VEHICLE WITH TILTABLE CAB

BACKGROUND OF THE INVENTION

This invention relates to vehicles with tiltable cabs.

In one known type of vehicle, usually a truck, a cab structure is mounted on the body structure of the vehicle for movement between a normal operating position and a tilted position in which access can be gained to the parts of the vehicle beneath the cab structure, usually the engine compartment. The cab structures for such vehicles are usually supported along one edge for movement about a pivot axis between the normal position and the tilted position, and one or more fixed supports are provided at positions radially spaced from the pivot axis for supporting the cab structure on the body structure when the cab structure is in its normal operating position. In addition to these supports, it is usual to provide a latch mechanism for retaining the cab in the normal operating position. Such latch mechanisms conventionally comprise a keeper attached to one of the structures and a latch member attached to the other structure and mounted for movement into and out of latching engagement with the keeper when the cab is in its normal operating position.

In one known arrangement, the latch mechanism includes a latch mounted on one of the structures and a keeper mounted on the other structure and the latch is arranged to make clamping contact with the keeper when the cab is in its normal operating position, so that the latch mechanism acts as one of the supports for the cab structure. This arrangement suffers from the disadvantage that, in use, the full weight of the cab structure bears against the keeper and causes rapid wear between the keeper and the latch member.

SUMMARY OF THE INVENTION

According to the present invention there is provided a motor vehicle comprising a body structure, a cab mounted on the body structure for movement about a pivot axis between a normal operating position and a tilted position, and a support radially spaced from the pivot axis for supporting the cab structure on the body structure in the normal operating position of the cab, the said support comprising a keeper attached to one of the structures and a latch member attached to the other structure and mounted for movement into and out of latching engagement with the keeper when the cab is in its normal operating position, characterised in that the keeper comprises a bracket mounted on the said one structure and a striker pin resiliently mounted in the bracket.

By resiliently mounting the striker pin in the bracket, the striker pin may move relative to the bracket. The force exerted on the keeper will be proportional to the effective mass of the cab and the effective mass of the keeper. Since the keeper is not fixed rigidly to the body structure, its effective mass will be relatively small. Consequently, the impact of the cab structure on the keeper will exert a relatively small impact force on the keeper resulting in a relatively low rate of wear of the keeper. The resilient mounting of the keeper also serves to reduce vibrations transmitted from the body structure to the cab structure when the vehicle is in motion thereby reducing noise in the cab structure.

Preferably, the vehicle comprises a further support of the cab structure spaced from the first mentioned support in the direction of the pivot axis, the further support comprising a keeper attached to one of the structures and having a bracket mounted thereon and a striker pin resiliently mounted in the bracket, and a latch member attached to the other structure and mounted for movement into and out of latching engagement with the keeper when the cab is in its normal operating position. The provision of two latches prevents the cab structure from tilting in the event of failure of one of the latches.

Desirably, the axis of the or each striker pins extends at right angles to the pivot axis of the cab so that the cab structure is positively located in two mutually perpendicular directions.

In the preferred embodiment of the invention, the striker pin of the or each keeper is mounted in its associated bracket by means of rubber bushes. Desirably, each rubber bush is mounted within a metal sleeve defining an aperture through which the striker pin projects. In the event of a very large force being applied to the cab structure, the striker pin will contact the metal sleeve which therefore acts as a stop for the relative movement between the striker pin and the bracket.

In order to prevent accidental operation of the latch member, the latch member is preferably operable by releasing linkage which includes an actuating member mounted for sliding movement in a housing between a first position, in which the latch member is locked in engagement with the keeper, and a second position in which the latch member is disengageable from the keeper, the actuating member being rotatable relative to the housing in the first position into a locked position in which the housing prevents the sliding movement of the actuating member. A sequence of movements is therefore required to effect release of the lock, thus reducing the risk of accidental release as a result, for example, of vibrations of the cab structure during operation of the vehicle.

Preferably, the actuating member is biased into the locked position so that the chances of accidental movement of the actuating member into the second position are further reduced. For example, the releasing linkage may comprise an operating rod which is connected to and mounted for sliding movement with the actuating member, and the actuating member may be rotatable relative to the operating rod and biased into the locking position by means of a coil spring acting between the actuating member and the operating rod.

The actuating member preferably lies wholly within the housing when the actuating member is in its locked position, and projects therefrom when the actuating member is in its second position, thus, giving a clearly visible indication of the condition of the lock.

Where the vehicle includes two latches, the latches are preferably operable by a releasing linkage which includes an operating lever for each latch movable between unlocking and locking positions, the operating levers for both latches being interconnected for simultaneous movement between the locking and unlocking positions. With such an arrangement, both latches can be operated from a single station on the vehicle.

In order to ensure that both latches are either simultaneously engaged or simultaneously disengaged, each operating lever is preferably movable into the locking position only when the latch member is in the closed position. This may for example, be achieved by providing mutually engaging cam surfaces on the operating lever and the latch member which allow movement of the operating lever into the locking position only when the latch member is in the closed position.

DESCRIPTION OF THE DRAWINGS

A preferred embodiment of the invention will now be described by way of example only with reference to the drawings in which.

DETAILED DESCRIPTION OF THE INVENTION

Figure 8:
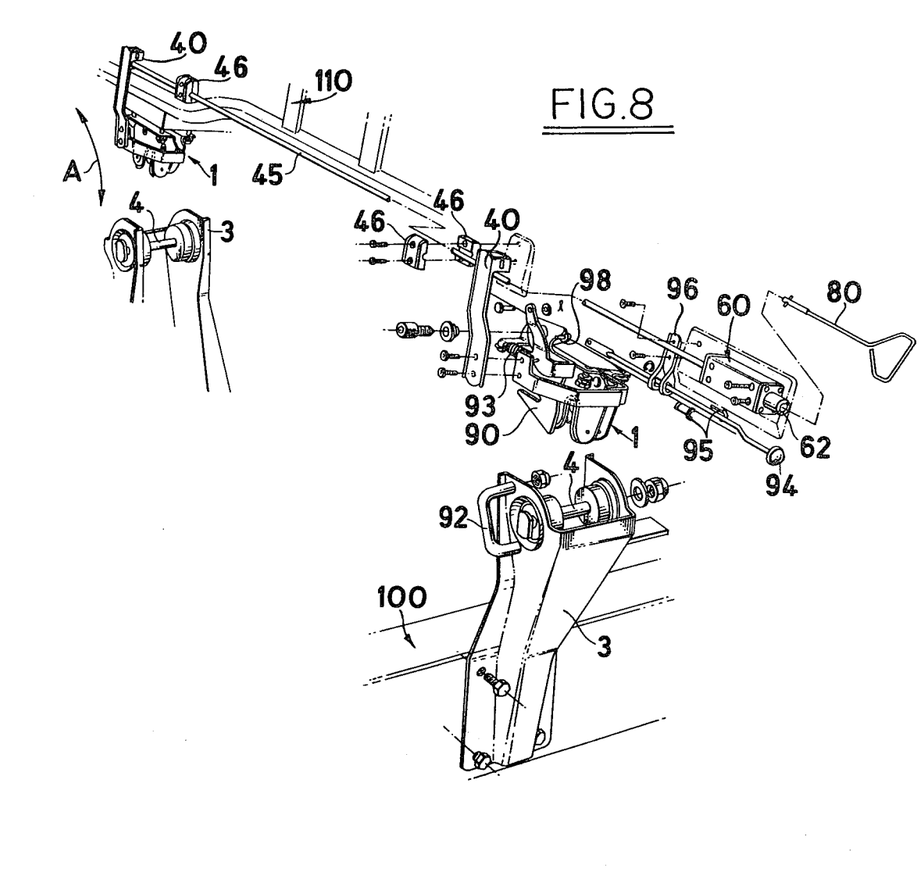

Referring to the drawings, a truck body structure 100 (FIG. 8) carries a cab structure 110 for pivotable movement as indicated by the arrow A in FIG. 8 about a transverse axis adjacent the front of the truck so that the cab structure can be moved between a normal position and a tilted position in which access can be gained to the engine compartment of the truck. The cab structure is retained in its normal operating position by means of a lock which comprises two similar latch mechanisms, indicated by the reference numerals 1, located on opposite sides of the vehicle radially spaced from the transverse axis and located adjacent the rear edges of the cab and body structures. The two latch mechanisms 1 are identical in construction and only one of the latch mechanisms will be described in detail.

Figures 1, 2:
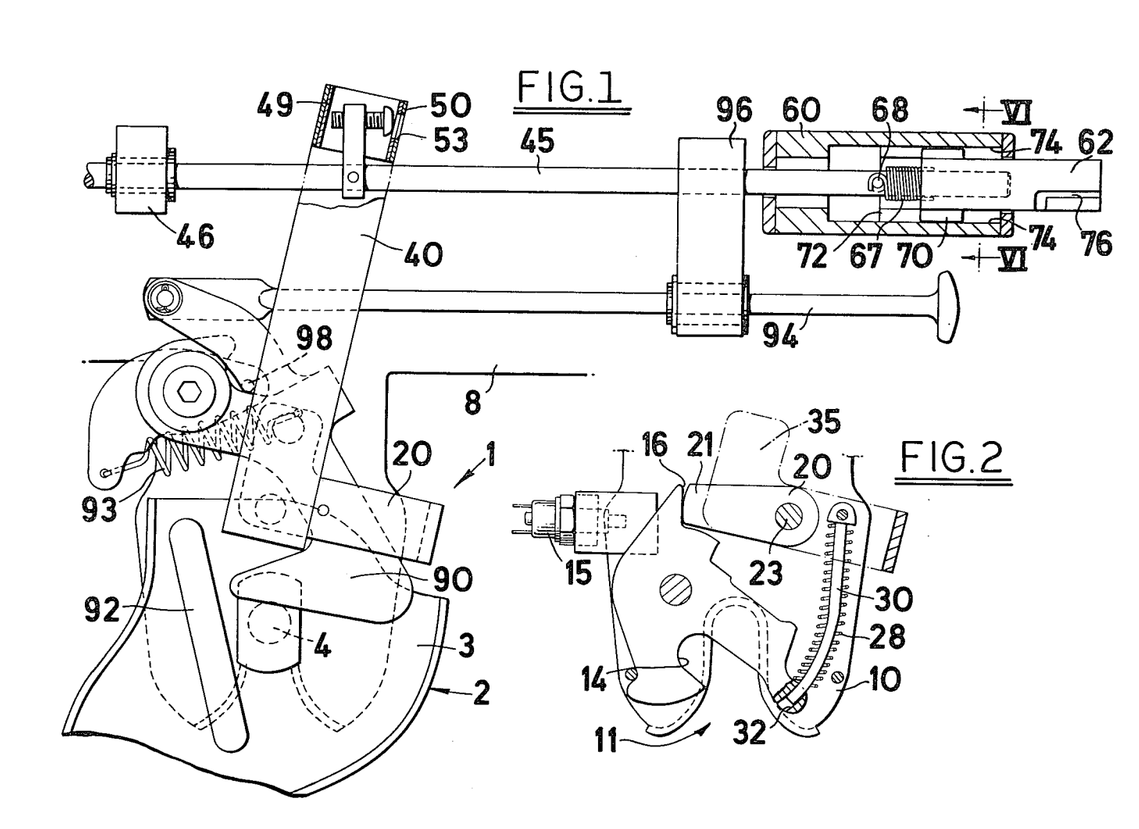
FIG. 1 is a side view, partly in cross-section, of a lock for a tiltable cab structure of a truck in accordance with the invention, the lock being unlocked.
FIG. 2 is a side view of a latch assembly incorporated in the lock of FIG. 1.
Figure 5:
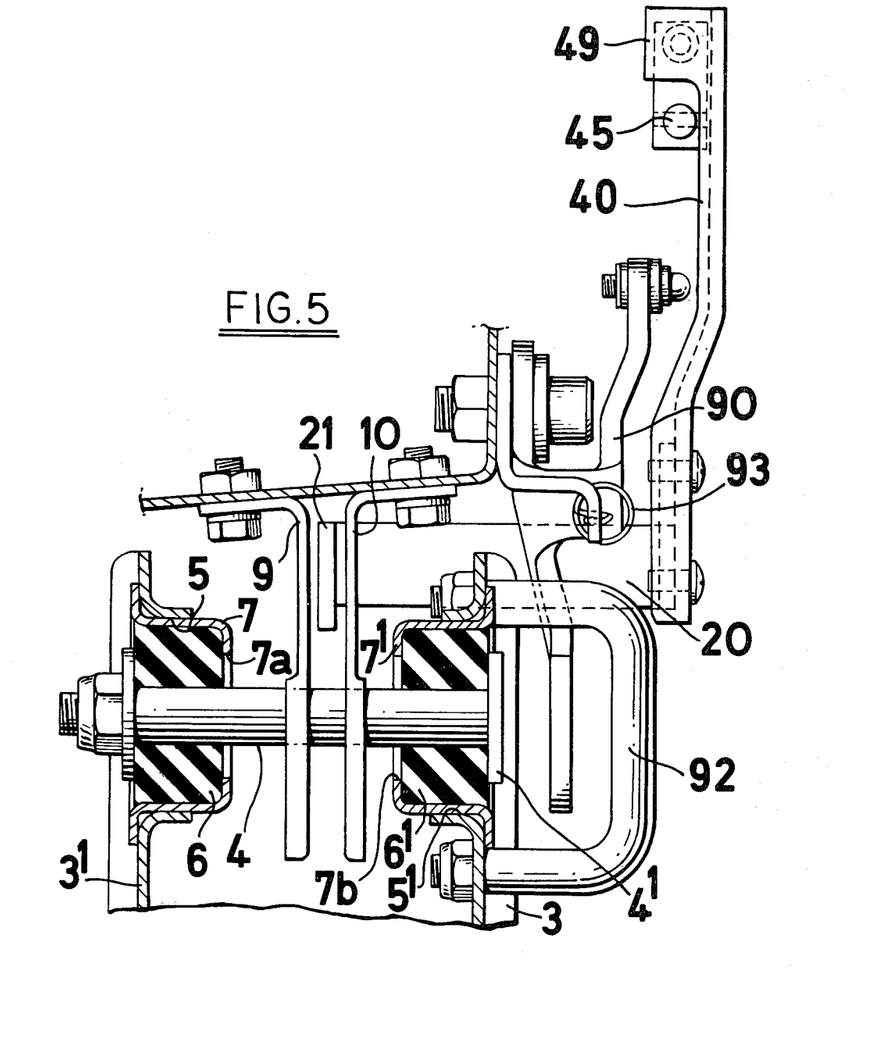
FIG. 5 is an end view of the lock of FIGS. 1 and 2, the latch assembly having been omitted for clarity.
Figure 6:
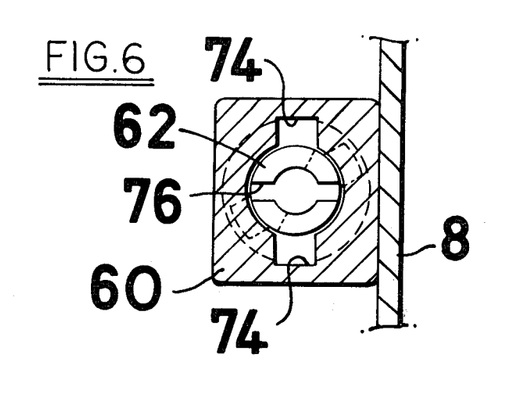
FIG. 6 is a cross-section of the lock taken along lines VI—VI of FIG. 1.

Referring to FIGS. 1 and 5, each latch mechanism 1 comprises a keeper 2 positioned on the body structure of the truck inwardly of the front wheel arch of the body structure. The keeper 2 comprises an upstanding bracket 3 rigidly mounted on the body structure of the truck. The bracket 3 includes two side flanges 3'. A keeper pin 4 is mounted in two apertures 5,5' in the side flange 3' by means of resilient rubber bushes 6,6'. Each bush 6,6' is supported in a metal sleeve 7,7' which defines an aperture 7a,b, through which the pin 4 extends. The aperture 7a is larger in diameter than the pin 4. The pin 4 is retained in the bracket 3 by a head 4' on one end of the pin, and a nut and washer on the other end of the pin, the head and washer being larger in diameter than the apertures 7a,b. If desired, the bushes 6,6' can be pre-stressed by tightening the nuts on the keeper 4.

Figures 3, 4:
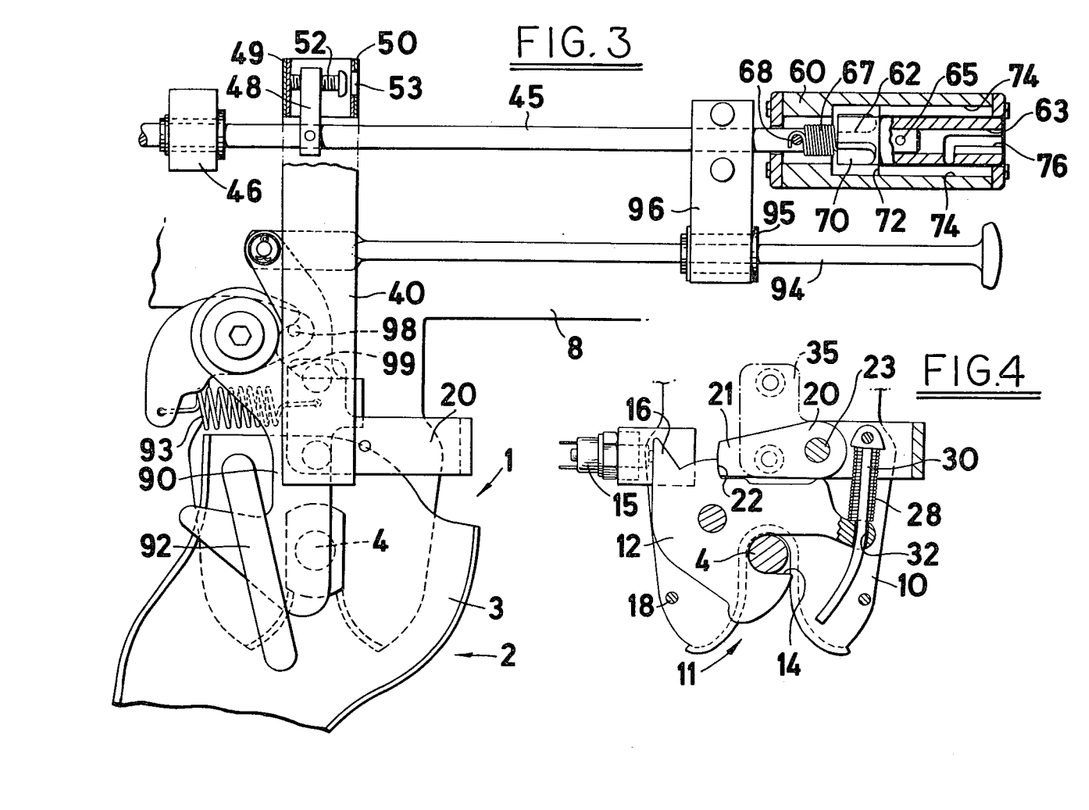
FIG. 3 is a view similar to FIG. 1 showing the lock in a locked position.
FIG. 4 is a view similar to FIG. 2 showing the latch assembly in the locked position.

The transverse frame member 8 of the cab structure carries two adjacent depending jaws 9, 10 which define a downwardly open recess 11 within which the pin 4 of the keeper is received when the cab structure is in its normal operating position (see FIG. 4). A latch member 12 is pivotally mounted between the jaws 9, 10. The member 12 also defines a recess 14 for receiving the pin 4 of the keeper 2. The member 12 is rotatable between an open position, illustrated in FIG. 2 and a closed position illustrated in FIG. 4. In the open position, the recess 14 in the member 12 allows the pin 4 of the keeper 2 to move into and out of the recess 11 in the jaws 9,10. In the closed position, the latch member 12 holds the pin 4 firmly in contact with the jaws 9, 10 and prevents it from disengaging therefrom. The latch mechanisms therefore act as supports for the cab structure when the cab structure is in its normal operating position.

The rubber bushes 6,6' permit limited relative movement between the keeper pin 4 and the bracket 3 so that vibrations between the body structure and the cab structure are damped thereby reducing the level of noise in the cab when the truck is in motion. Additionally, the bushes 6,6' reduce the noise created when the cab is lowered onto the pins 4 into its normal operating position.

The presence of the rubber bushes 6,6' also has the effect of reducing wear on the pin 4 caused by repeated impacts between the pin 4 the jaws 9,10, and the latch member 12. Thus, since the pin 4 can yield relative to the bracket 3 the force of any impact applied to the pin by the cab is much smaller than the force which would be exerted if the pin were fixed.

The keeper pins 4 are both oriented at 90° to the transverse pivot axis of the cab structure. While the pivotal mountings of the cab structure serve to locate the cab structure relative to the body structure in the fore-and-aft direction, the keeper pins 4 locate the cab structure in the transverse direction. Since the jaws 9, 10 define a flared entrance, they guide the cab structure into position relative to the body structure as the cab structure is moved into its normal operating position. Any minor misalignment in the relative positions of the cab and body structures due to manufacturing tolerances is accommodated by the resilient bushes 6,6' which allow the keepers 4 to deflect relative to the brackets 3 upon closure of the cab structure. The resulting stress in the bushes 6,6' applies a reaction force to the pins 4 which ensures that the pins 4 are held firmly against the latch members 12.

A limit switch 15 is mounted on the jaws 9, 10 for engagement with an upstanding projection 16 on the latch member 12 when the latch member 12 is in its closed position. The movement of the latch member 12 into the open position is limited by a stop 18 mounted between the two jaws, 9, 10.

The latch member 12 is retained in the closed position by means of a pawl 20. The pawl 20 is generally U-shaped one limb 21 extending between the jaws 9, 10 into engagement with an abutment 22 on the latch member 12. The pawl 20 is pivotally connected to the jaws 9, 10 so that rotation of the pawl about its pivotal axis 23 disengages the limb 21 from the abutment 22, as illustrated in FIG. 2, thus permitting the latch member 12 to rotate into the open position. The latch member 12 is biased into the open position by means of a compression spring 28 which acts between the pawl 20 and the latch member 12. The compression spring 28 is located between the pawl 20 and the latch member 12 by means of a guide rail 30 around which the compression spring 28 is coiled. The guide rail 30 is pivotally connected at one end to the pawl 20 and passes through an aperture 32 in the latch member 12. The guide rail 30 is a sliding fit in the aperture 32 and is curved to permit free movement of the latch member 12 into the open position.

The other limb 35 of the U-shaped pawl 20 is bolted to an operating lever 40. A transverse operating rod 45 is mounted on the frame structure 8 of the cab by means of two spaced brackets, one of which is illustrated at 46. The operating rod 45 is connected to each of the operating levers 40 of the lock assemblies on opposite sides of the truck. The connection between the operating rod 45 and each operating lever 40 is effected by means of a block 48 which is rigidly secured to the operating rod 45 and which projects upwardly from the operating rod 45 between two flanges 49, 50 formed on the upper end of the operating lever 40. A locking bolt 52 is threadedly mounted in the block 48 and can be adjusted by passing a screw-driver through an aperture 53 in one of the flanges 50. In use, the locking bolt 52 is threaded into the block 48 so that the end of the bolt 52 engages firmly against the flange 49 of the operating lever when the lock assemblies are both locked. Tightening of the bolt 52 against the flange 49 eliminates free movement between the operating lever 40 and the pawl 20, and takes up slackness in the system due to manufacturing tolerances thus reducing rattling when the truck is in motion and preventing accidental release of the lock as a result of movement of the lever 40.

The end of the operating rod 45 is slidingly received in one end of a housing 60 mounted on the cab structure. An actuating member 62 is also mounted for sliding movement within the housing 60 between a withdrawn position (illustrated in FIG. 3) and an extended position (illustrated in FIG. 1). The actuating member 62 defines a central axial bore 63 within which the end of the operating rod 45 is received. The operating rod 45 is fixed within the bore 63 by means of a transverse pin 65. The pin 65 is received in a circumferential groove in the wall of the bore 63 so that the actuating member 62 can rotate relative to the operating rod 45 but is fixed for axial sliding movement therewith. The operating rod 45 and the actuating member 62 are connected together by a coil spring 67. This spring 67 is in the form of a double helix. One end of each helix is connected to a transverse pin 68 mounted in the operating rod 45 and the other end of each helix is received in an axial bore in the end of the actuating member 62. The ends of each helix are located on diametrically opposite sides of the actuating member 62 and the operating rod 45 respectively so that when the actuating member 62 is rotated relative to the operating rod 45 an even bias is applied to the opposite sides of the operating rod 45 and the actuating member 62.

Figure 7:
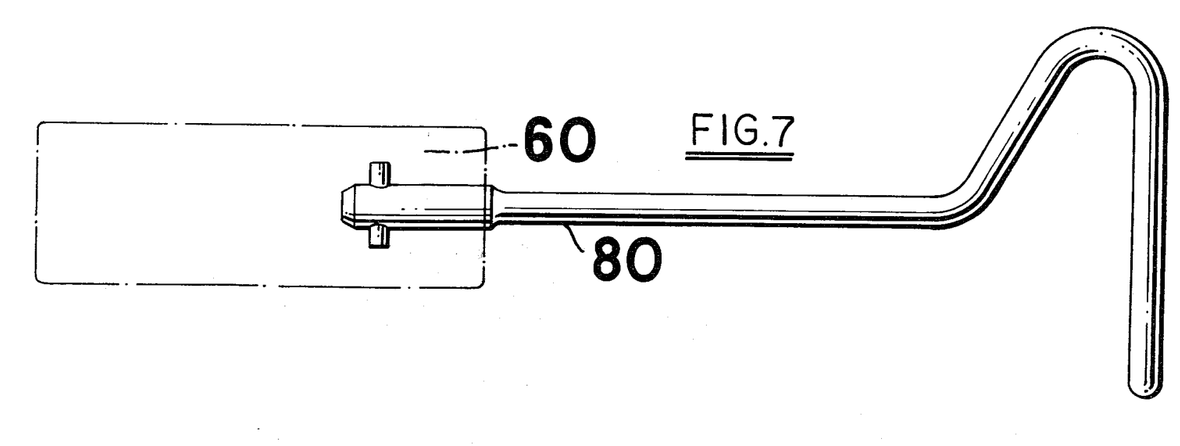
FIG. 7 is a plan of an operating handle used in conjunction with the lock of FIGS. 1 to 6 and FIG. 8 is an "exploded" perspective view of the lock installed in a vehicle.

The end of the actuating member 62 adjacent the coil spring 67 includes two diametrically opposed radially extending projections 70 which, in the withdrawn position of the actuating member 62, as illustrated in FIG. 3, engage with an internal wall 72 in the housing which prevents axial movement of the actuating member 62 into the extended position illustrated in FIG. 1. The housing 60 defines two diametrically opposed axially extending internal grooves 74 which register with the projections 70 when the actuating member 62 is rotated through 60° from the position illustrated in FIG. 3. In the position illustrated in FIG. 3 therefore, the actuating member 62 is locked and cannot slide relative to the housing 60. Rotation of the actuating member 62 relative to the operating rod 45 causes the coil spring 67 to be stressed. The actuating member 62 is therefore biased into the locking position by the spring 67. At the end of the actuating member 62, remote from the coil spring 67, the central bore 63 is provided two L-shaped slots 76 which provide a bayonet connection with an operating handle 80, illustrated in FIG. 7. The operating handle 80 is detachable from the actuating member 62 and therefore may be stored in a position remote from the lock, for example in the interior of the cab. This prevents the lock from being released accidentally.

The lock also incorporates a safety catch to safeguard further against accidental release of the lock. To facilitate assembly, the safety catch is constructed as a separate subassembly from the latches and the latch operating mechanism and is operable independently thereof. The assembly comprises a safety latch member 90 which is pivotally mounted on the frame structure 8 for movement between a latched position, illustrated in FIG. 3, and an unlatched position, illustrated in FIG. 1. In the latched position, the safety latch 90 projects into a closed aperture defined by a U-shaped catch 92 mounted on the bracket 3 of the keeper 2. The provision of a closed aperture for engagement by the latch 90 is preferred to a simple keeper pin because the risk of disengagement of the safety catch in the event of an impact on the truck is reduced. The catch 92 is positioned relative to the safety latch member 90 so that there is no contact between the catch and the safety latch member, thereby preventing the latch member 90 from rattling against the catch 92 when the truck is in motion. The safety latch member 90 is movable against the bias of a tension spring 93 between the latched and unlatched positions by means of a releasing handle 94 mounted in a split bush 95, a bracket 96 secured by the frame member 8 adjacent the housing 60 for the actuating member 62.

When the safety catch is engaged, the end of the handle 94 lies in the same vertical plane as the end of the housing 60 so that the operator can quickly observe the condition of the safety catch.

The safety latch mechanism is provided on only one of the lock assemblies 1 so that the complete lock is operable from one side of the vehicle. The movement of the safety latch 90 between the latched and unlatched positions is limited by a single stop pin 98 which is received within a recess 99 in the safety latch member and engages opposite walls thereof in the latching and unlatching positions respectively. The stop pin 98 serves the additional function of resisting the torque which is applied to the safety latch member 90 during assembly as the pivotal mounting for the safety latch member 90 is tightened.

The operation of the lock is as follows. With the cab in its normal operating position the lock will be in the closed position illustrated in FIG. 3. In this position the projections 70 engage with the internal wall 72 in the housing 60 and prevent movement of the actuating member 62, and therefore the operating rod 45 and levers 40, to the right as seen in FIG. 3. Accidental blows to the levers 40 or operating rod 45 cannot therefore release the latches.

If it is desired to release the lock, the handle 80 is inserted into the slots 76 in the end of the actuating member 62 and rotated through 60° to effect a driving engagement in the inner ends of the L-shaped slots 76. The handle 80 is then rotated through a further 60° in order to bring the projections 70 on the inner end of the actuating member 62 into registry with internal grooves 74 in the housing 60. The handle 80 is then pulled so that the actuating member 62 slides in the housing 60 into the withdrawn position illustrated in FIG. 1. The operating rod 45 moves with the actuating member 62, causing the locking bolt 52 to engage with the flange 50 of the operating lever 40. Movement of the operating lever 40 allows the pawl 20 to pivot about the pivot axis 23 under the influence of the compression spring 28, thereby disengaging the limb 21 of the pawl 20 from the abutment 22 on the latch member 12. The latch member 12 then rotates into its open position under the influence of the compression spring 28. The safety latch is then released by depressing the releasing handle 94 to disengage the safety latch member 90 from the catch 92, thus allowing the cab to be tilted relative to the body structure. Movement of the latch member 12 into the open position disengages the projection 16 from the switch which in turn actuates a warning light in the truck cab.

When the cab is returned to its normal operating position, the lock will initially occupy the configuration indicated in FIG. 1. As the cab structure moves towards the body structure, the pin 4 of the keeper 2 enters a recess 11 in the jaws 9 and 10 and engages in the recess 14 in the latch member 12. Continued downward movement of the cab structure causes the pin 4 to rotate the latch member 12, thereby compressing the spring 28. As the cab structure approaches the end of its movement, the projection 16 engages with the limit switch and the pawl 20 rotates anticlockwise as illustrated in FIG. 1 under the influence of the compression spring 28 to engage with the abutment 22 on the latch member 12, thus locking the latch member 12 in the closed position. As the pawl 20 moves into the locked position, the operating lever 40 is also moved anticlockwise as seen in the drawings so that the flange 50 engages the locking bolt 52. The continued movement of the operating lever 40 causes the operating rod 45 to slide to the left as shown in the drawings thus moving the actuating member 62 from the extended position shown in FIG. 1 into the withdrawn position indicated in FIG. 3. When the actuating member is fully withdrawn into the housing 60, it is rotated by the coil spring 67 so that the projections 70 are moved out of registry with the internal grooves 74. Lowering the cab into its normal operating position therefore automatically closes the latches and causes the lock to move into its locking position. No further manipulation of the lock by the operator is required. During the closing movement, of the lock assembly, the safety latch member 90 initially engages the upper limb of the catch 92 and is displaced in an anticlockwise direction as seen in the drawings against the bias of the tension spring 93. As the latch member 12 engages the pin the latch member 90 automatically engages the underside of the upper limb of the catch 92. When the lock is fully closed, the safety latch member 90 moves into the locking position illustrated in FIG. 3 between the two limbs of the catch 92.

Since the movement of the pawl 20 into engagement with the abutment 22 on the latch member 12 is fully engaged in its closed position, the actuating member 62 is only moved from the extended position into the withdrawn position when the lock assembly is fully closed. In this position the end face of the actuating member lies flush with the end face of the housing 60. The projection of the actuating member 62 from the end face of the housing 60 therefore gives a visible indication of the condition of the cab lock. The condition of the lock may be indicated more clearly by forming the actuating member from a plastic material such as nylon having a different colour from the material from which the end face of the housing 60 is composed.

The embodiment of the invention described above therefore provides a self-locking latch mechanism for a tiltable truck cab structure which includes a separate operating handle and which is therefore less susceptible to accidental actuation than similar devices incorporating a fixed operating handle. The condition of the lock is clearly indicated by the relative positions of the housing and the actuating member and the engagement of the actuating member with the housing when the actuating member is withdrawn prevents accidental operation of the latch assembly as a result of vibration.

We claim:

1. A motor vehicle comprising a body structure, a cab mounted on the body structure for movement about a pivot axis between a normal operating position and a tilted position, and a support radially spaced from the pivot axis for supporting the cab structure on the body structure in the normal operating position of the cab, at least one of the supports comprising a keeper attached to one of the structures and a latch member attached to the other structure and mounted for movement into and out of latching engagement with the keeper when the cab is in its normal operating position, characterized in that further support is provided for the cab spaced from the first mentioned support in the direction of the pivot axis, and comprising a keeper attached to one of the structures and having a bracket mounted on the said one structure, and a striker pin resiliently mounted in the bracket, and a latch member attached to the other structure and mounted for movement into and out of latching engagement with the keeper when the cab is in its normal operating position.

2. A motor vehicle according to claim 1 wherein the axis of the keeper pin extends at right angle to the pivot axis of the cab structure.

3. A motor vehicle according to claims 1 or 2 wherein the striker pin of the or each keeper is mounted in its associated bracket by means of rubber bushes.

4. A motor vehicle according to claim 3 wherein each rubber bush is mounted within a metal sleeve defining an aperture through which the striker pin projects.

5. A vehicle according to claim 1 or 4, wherein the latch member is operable by a releasing linkage which includes an actuating member mounted for sliding movement in a housing between a first position, in which the latch member is locked in engagement with the keeper, and a second position in which the latch member is disengageable from the keeper, the actuating member being rotatable relative to the housing in the first position into a locked position in which the housing prevents the sliding movement of the actuating member.

6. A vehicle according to claim 5 wherein the actuating member is biased into the locked position.

7. A vehicle according to claim 6 wherein the releasing linkage includes an operating rod connected to the actuating member and mounted for sliding movement therewith, the actuating member being rotatable relative to the operating rod.

8. A vehicle according to claim 7 wherein the actuating member is biased into the locking position by means of a coil spring acting between the actuating member and the operating rod.

9. A vehicle according to claim 8 wherein the coil spring is in the form of a double helix, the ends of each helix being located on diametrically opposite sides of the actuating member and operating rod respectively.

10. A vehicle according to claim 9 wherein the actuating member is received wholly within the housing when the actuating member is in the locked position and projects from the end face of the housing when the actuating member is in its second position.

11. A vehicle according to any one of claim 10 wherein the actuating member is adapted to receive a movable operating handle by means of which the actuating member may be moved relative to the housing.

12. A vehicle according to any one of claim 11 further comprising a releasable safety catch for retaining the cab structure in the normal operating position and operable independently of the releasing linkage.

13. A vehicle according to claim 12 wherein the safety catch comprises a safety latch member attached to one of the structures and a safety catch member attached to the other structure, the safety catch member being arranged for automatic locking engagement with the catch member upon movement of the cab structure into its normal operating position.

14. A vehicle according to claim 11 comprising a further latch which is spaced transversely from the first mentioned latch and which comprises a keeper attached to one of the structures, a latch member attached to the other of the structures and mounted to effect movement into and out of a closed position to effect latching engagement with the keeper, and the latches are operable by a releasing linkage which includes an operating lever for each latch movable between an unlocking position, in which the latch member is disengageable from the keeper, and a locking position, in which the latch member is retained in engagement with the keeper, the operating levers being interconnected for simultaneous movement between the locking and unlocking positions.

15. A vehicle according to claim 14 wherein each operating lever is movable into the locking position only when the latch member is in the closed position.

16. A vehicle according to claim 15 wherein the latch member of each latch is moved into the closed position by engagement with the keeper.

17. A vehicle according to claim 16 wherein the operating lever and latch member of each latch include mutually engaging cam surfaces which allow movement of the operating lever into the locking position only when the latch member is in the closed position.

* * * * *